US010606940B2

(12) United States Patent
Fume et al.

(10) Patent No.: US 10,606,940 B2
(45) Date of Patent: Mar. 31, 2020

(54) ANNOTATION SHARING METHOD, ANNOTATION SHARING APPARATUS, AND COMPUTER PROGRAM PRODUCT

(71) Applicant: KABUSHIKI KAISHA TOSHIBA, Tokyo (JP)

(72) Inventors: Kosei Fume, Kanagawa (JP); Masahiro Morita, Kanagawa (JP); Yuka Kuroda, Kanagawa (JP); Yoshiaki Mizuoka, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 142 days.

(21) Appl. No.: 15/071,690

(22) Filed: Mar. 16, 2016

(65) Prior Publication Data

US 2016/0196253 A1 Jul. 7, 2016

Related U.S. Application Data

(63) Continuation of application No. PCT/JP2013/075499, filed on Sep. 20, 2013.

(51) Int. Cl.
*G06F 17/24* (2006.01)
*G06F 17/22* (2006.01)
*G06F 16/9535* (2019.01)
*G06F 3/16* (2006.01)

(52) U.S. Cl.
CPC ............ *G06F 17/241* (2013.01); *G06F 3/167* (2013.01); *G06F 16/9535* (2019.01); *G06F 17/2247* (2013.01)

(58) Field of Classification Search
None
See application file for complete search history.

(56) References Cited

U.S. PATENT DOCUMENTS

| 9,430,141 B1 * | 8/2016 | Lu ......................... G06F 17/241 |
| 2002/0129057 A1 | 9/2002 | Spielberg |
| 2007/0055926 A1 * | 3/2007 | Christiansen ......... G06F 17/241 715/210 |
| 2007/0294614 A1 * | 12/2007 | Jacquin ............... G06F 17/2247 715/230 |
| 2011/0010175 A1 | 1/2011 | Kitade et al. |

(Continued)

FOREIGN PATENT DOCUMENTS

| JP | 2005-506602 A | 3/2005 |
| JP | 2009-070278 A | 4/2009 |

(Continued)

OTHER PUBLICATIONS

Hideo Kataoka, "RegzaAppsConnect Offering New Television Viewing Style", Toshiba Review, vol. 67, No. 6, Toshiba Corp., Jun. 1, 2012, pp. 2 to 7.

*Primary Examiner* — Howard Cortes
(74) *Attorney, Agent, or Firm* — Foley & Lardner LLP

(57) ABSTRACT

According to an embodiment, an annotation sharing method includes outputting a content; acquiring an annotation positioned in the content; calculating a position of the annotation in the content using information, that is related to the content and is usable for specifying the position of the annotation in the content, without using a body of the content; and storing the calculated position and the annotation in association with each other and in a readable manner.

10 Claims, 7 Drawing Sheets

(56) References Cited

U.S. PATENT DOCUMENTS

| | | |
|---|---|---|
| 2012/0078633 A1 | 3/2012 | Fume et al. |
| 2012/0310642 A1 | 12/2012 | Cao et al. |
| 2013/0031453 A1 | 1/2013 | Griffiths et al. |
| 2013/0080160 A1 | 3/2013 | Fume et al. |
| 2015/0006573 A1 | 1/2015 | Fusume et al. |

FOREIGN PATENT DOCUMENTS

| | | |
|---|---|---|
| JP | 2010-066949 A | 3/2010 |
| JP | 2010-114808 A | 5/2010 |
| JP | 2010-114808 A | 5/2010 |
| JP | 2011-023811 A | 2/2011 |
| JP | 2011-023811 A | 2/2011 |
| JP | 2011-061528 A | 3/2011 |
| JP | 2012-073519 A | 4/2012 |
| JP | 2013-008357 A | 1/2013 |
| WO | WO-2009/122779 A1 | 10/2009 |

* cited by examiner

FIG.1

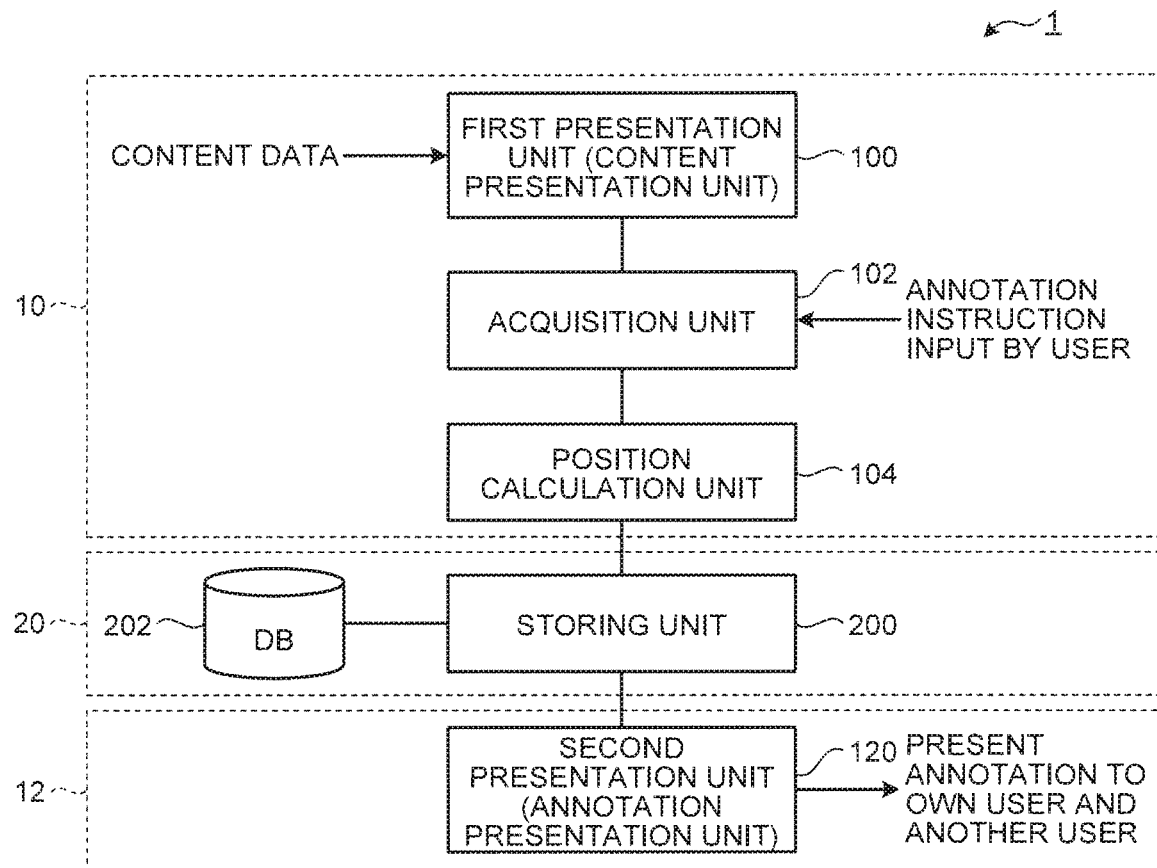

FIG.2

```
<title>CORE OF CRAYON</title>
<author>JUHSAKU YUMEHARA</author>
<body>
  <p id="qmsx_0003"><a href="qmsx0002.smil#qmsx_0003">
  A child draws a picture with a crayon. The crayon is broken many times because too much force is applied.</a></p>
  <p id="qmsx_0004"><a href="qmsx0002.smil#qmsx_0004">"This crayon is bad!"</a></p>
  <p id="qmsx_0005"><a href="qmsx0002.smil#qmsx_0005">The child says and replaces the broken crayon with a crayon of a different color one after another. The replaced crayon, however, is also snapped.</a></p>
```

FIG.3

```
<smil>
...
<text src="p.html#xqms_0003"
 id="xqms_0003" />
<audio src="2_2.mp3"
 clip-begin="npt=2.357s"
 clip-end="npt=4.708s" />
<text src="p.html#xqms_0004"
 id="xqms_0004" />
<audio src="2_2.mp3"
 clip-begin="npt=4.708s"
 clip-end="npt=9.227s" />
```

FIG.4

ANNOTATION INFORMATION

| POSITION | ATTRIBUTE | VALUE |
|---|---|---|
| * | UNDERLINE | – |
| * | COMMENT | "I WAS IMPRESSED" |
| * | ENCLOSURE | – |

FIG.7

```
<smil>
...
<text src="p.html#xqms_0003" id="xqms_0003" />
<audio src="2_2.mp3" clip-begin="npt=2.357s" clip-end="npt=4.708s" />
<text src="p.html#xqms_0004" id="xqms_0004" />
<audio src="2_2.mp3" clip-begin="npt=4.708s" clip-end="npt=9.227s" />
...
```

FIG.8

EXAMPLE OF CORRESPONDING TEXT DATA
(DIRECT ACCESS IS NOT PERMITTED)

FEMALE SPEAKER
```
...
If ···, this standard is fully accepted.
```

MALE SPEAKER
```
   For extinguishing such a wrongful act, it is necessary for all people in the society to cooperate with one another with enthusiasm.
   Further utilization of this book ······
```

EXAMPLE OF CORRESPONDING BOOK-RELATED DATA (SPEAKER DEFINITION)

```
<smil>
...
<text id="xqms_0003" />
<audio taker="Hanako"/>
<text id="xqms_0004" />
<audio taker="Hanako"/>
<text id="xqms_0005" />
<audio taker="Kenji"/>
<text id="xqms_0006" />
<audio taker="Kenji "/>
<text id="xqms_0007" />
<audio taker="Kenji"/>
```

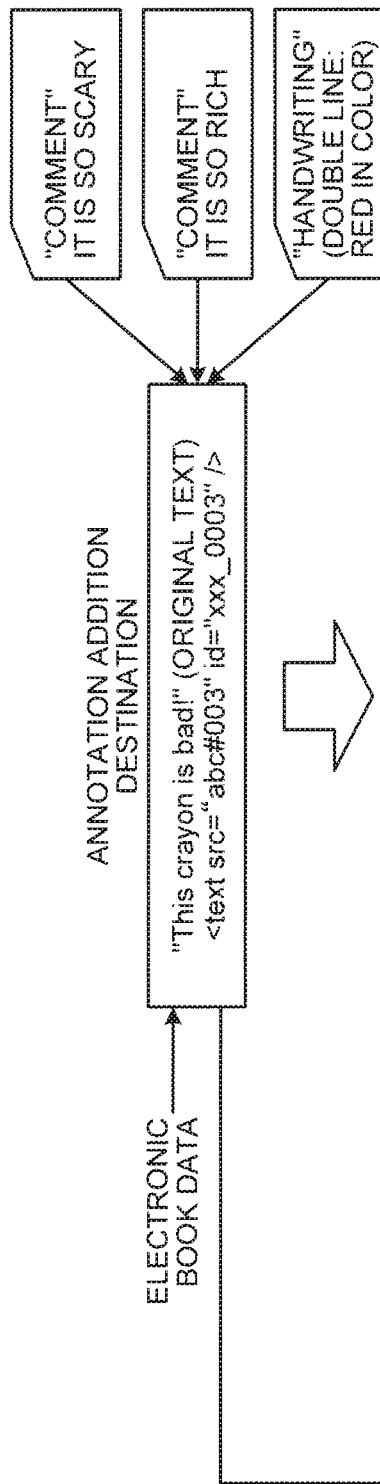

ANNOTATION SHARING METHOD, ANNOTATION SHARING APPARATUS, AND COMPUTER PROGRAM PRODUCT

CROSS-REFERENCE TO RELATED APPLICATIONS

This application is a continuation of PCT international application Ser. No. PCT/JP2013/075499 filed on Sep. 20, 2013, which designates the United States; the entire contents of which are incorporated herein by reference.

FIELD

An embodiment described herein relates generally to an annotation sharing method, an annotation sharing apparatus, and a computer program product.

BACKGROUND

In recent years, with the spread of compact terminals and the improvement of their performances, dedicated terminals for electronic books and contents distribution services, which were conventionally unrealistic, have been spread. In addition, with the electronic processing of books, terminals also have been provided that include not only text browsing functions but also reading functions with voice synthesis. Furthermore, with the spread of various electronic book formats (e.g., a digital accessible information system (DAISY)) taking into consideration persons with visual disabilities and persons with learning disabilities, contents in which reading voice data is embedded have been gradually spread, for example.

In general, electronic books essentially composed of texts are flow style data without having fixed pages. To point a certain position in an electronic book, designation based on text data is required. For copyright protection and security reasons, it is, however, often difficult or not permitted to directly access the text data.

BRIEF DESCRIPTION OF THE DRAWINGS

FIG. 1 is a block diagram exemplarily illustrating a structure of an annotation sharing apparatus according to an embodiment;

FIG. 2 is a diagram illustrating an example of book data read by a first presentation unit;

FIG. 3 is a diagram illustrating an example of document meta data associated with the book data read by the first presentation unit;

FIG. 4 is a table illustrating an exemplary structure of annotation information;

FIG. 7 is a diagram exemplarily illustrating a logical element at a reading position;

FIG. 8 is a diagram exemplarily illustrating the logical elements of reading parameters;

FIG. 9 is a diagram schematically illustrating a specific example of data stored in the DB by a storing unit.

DETAILED DESCRIPTION

Figure 5:
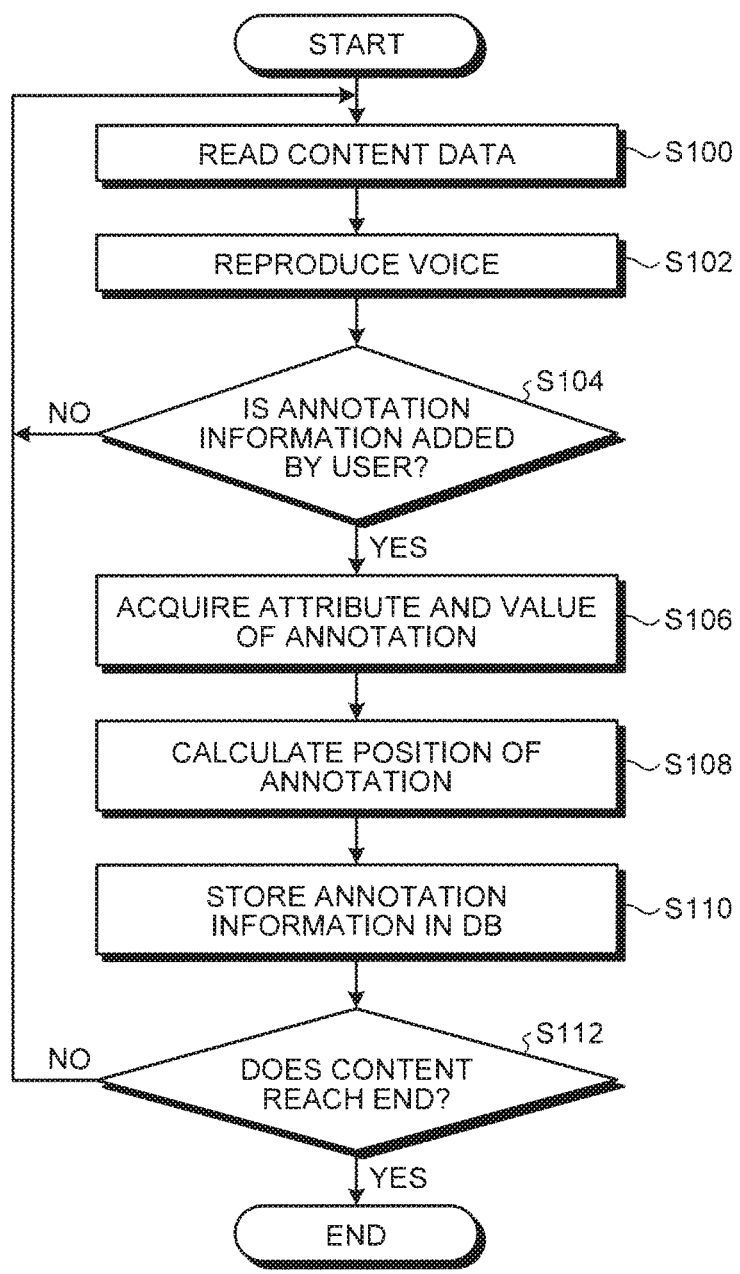
FIG. 5 is a flowchart illustrating processing performed by the annotation sharing apparatus according to the embodiment to store the annotation information in a DB.

According to an embodiment, an annotation sharing method includes outputting a content; acquiring an annotation positioned in the content; calculating a position of the annotation in the content using information, that is related to the content and is usable for specifying the position of the annotation in the content, without using a body of the content; and storing the calculated position and the annotation in association with each other and in a readable manner.

An embodiment will be described with reference to the accompanying drawings.

FIG. 1 is a block diagram exemplarily illustrating a structure of an annotation sharing apparatus 1 according to the embodiment. As illustrated in FIG. 1, the annotation sharing apparatus 1 includes an annotation adding unit 10, an annotation output unit 12, and an annotation storing unit 20. The annotation sharing apparatus 1 is implemented by a general purpose computer or a client server system, for example. The annotation sharing apparatus 1 may be a computer that includes a CPU, a storage device, an input-output device, and a communication interface, or a client that utilizes sources stored in a server, or may include a plurality of servers and a plurality of clients.

The annotation adding unit 10 and the annotation output unit 12 may be included separately in different computers or in a single computer, for example. The annotation storing unit 20 may be included in a server, for example, and configured to communicate with the annotation adding unit 10 and the annotation output unit 12. The annotation adding unit 10, the annotation output unit 12, and the annotation storing unit 20 may be configured to be combined in any combination manner and execute an annotation sharing program.

The annotation adding unit 10 includes a first presentation unit (content presentation unit) 100, an acquisition unit 102, and a position calculation unit 104, for example. The first presentation unit 100 reads content data such as an electronic book (in a DAISY format, for example), acquires accessible information such as a voice or bibliographic information, and presents the content to a user with a display and a voice, for example. The first presentation unit 100 reproduces (outputs) contents by hardware such as a display device and a speaker, which are not illustrated, and software executed by the CPU, for example.

FIG. 2 is a diagram illustrating an example of book data (content body or text data) read by the first presentation unit 100. An XHTML is used in the book data for structuring texts and voices, for example.

FIG. 3 is a diagram illustrating an example of document meta data (book-related data) associated with the book data read by the first presentation unit 100. A synchronized multimedia integration language (SMIL) is used in the book-related data for synchronizing voice data with texts, images, and the like. The book-related data, which employs an MP3 as an audio format, is a navigation file in which definitions for voice reproduction are written.

The text data included in text elements of the book data illustrated in FIG. 2 and the book-related data illustrated in FIG. 3 is assumed to be difficult to be directly accessed. For example, the text data is assumed to be encrypted and the XML tag structure illustrated in FIG. 2 can be read, but the text elements cannot be read because unreadable (encoded) character strings are inserted. As a result, the text data is assumed to be inaccessible. Alternatively, the file of the book data illustrated in FIG. 2 is assumed to be inaccessible or implicit designation by referring to the text data is assumed not to be permitted.

In contrast, the navigation file illustrated in FIG. 3 is assumed to be accessible information because the navigation file is the meta data in which the text data is not written. In addition, the navigation file is assumed to be allowed to acquire the correspondence between the voice data corresponding to the book data and a chapter unit or a section unit by an API accessible to the book data, for example.

The acquisition unit 102 (illustrated in FIG. 1) acquires annotation instruction input by a user. The annotation instruction input means input to specify the annotation by the following exemplary actions. The user adds a symbol or a marking to the text (content) displayed on the annotation sharing apparatus 1 in handwriting with a pen serving as an input device or specifies the pen gesture, or presses down a button used for comment insertion on the annotation sharing apparatus 1 (reproduction terminal). The acquisition unit 102 may acquire the annotation instruction from voice input. The acquisition unit 102 may be implemented by hardware or software.

The information (annotation information) embedded in (added to) the content by the annotation instruction input is assumed to include the position of the annotation in the content, and the attribute and the value of the annotation, for example. FIG. 4 is a table illustrating an exemplary structure of the annotation information. Letting the position of the annotation in the content be temporarily denoted by "*", for example, the annotation is associated with the content as the annotation information illustrated in FIG. 4 by the procedure described later.

The position calculation unit 104 (illustrated in FIG. 1) calculates and specifies the position to which each annotation is added in the content using the annotation instruction input acquired by the acquisition unit 102. For example, the position calculation unit 104 calculates the position pointed by the annotation in the content step by step as described later, and specifies the finest-grained information as position information. The position calculation unit 104 may be implemented by hardware or software.

The annotation storing unit 20 includes a storing unit 200 and a database (DB) 202. The storing unit 200 stores, in the DB 202, the annotation for the content and the position of the annotation in the content, which has been calculated by the position calculation unit 104 using the content-related information, in association with each other and in a readable manner. The storing unit 200 may be implemented by hardware or software. For example, the DB 202 is implemented by a single or a plurality of hard disk drives (HDDs). The storing unit 200 may include a function of reading the position in the content and the annotation that are stored in a readable manner.

The annotation output unit 12 includes a second presentation unit (annotation presentation unit) 120. The second presentation unit 120 presents (outputs) the annotation by hardware such as a display device and a speaker, which are not illustrated, and software executed by the CPU, for example.

Specifically, the second presentation unit 120 presents the annotation at the stored position in the content, in a voice, for example, during the presentation (reproduction) of the content. The second presentation unit 120 can indicate that the annotation is added to the added position in the content and present the value simultaneously if the annotation is added to (associated with) the content. The user and another user, thus, can refer to the added annotation in linkage with the reproduction of the content. The reproduction of the content may be performed by the annotation output unit 12. Alternatively, the annotation sharing apparatus 1 may separately include a content reproduction unit that reproduces the content and the content reproduction unit may reproduce the content.

For example, when the text of the content of a book can be used by directly access the text, the position pointed by the annotation can be specified by index information produced based on the character strings of the text or can be directly designated by an XML path language (XPath). Thus, the embodiment may not be applied to this case. When the content as well as the bibliographic information and the voice data are fully inaccessible from the outside, the annotation can be simply associated with only the granularity of the whole content. This case is, thus, a special case of the embodiment.

The flow type electronic book format includes the bibliographic information such as a title, a table of contents, and the author's name and the read voice data as the information usable (accessible) from the outside, for example. The voice synthesis reading of the electronic book can perform reproduction by changing voice-related parameters such as a reproduction speed, a reading speaker, a pitch, and a tempo unlike typical movies and moving image contents. As a result, the elapsed time in seconds differs for each reproduction condition by the user. Thus, sometimes, the annotation cannot be added simply based on a time stamp. Even in such cases, according to the embodiment, the annotation can be added to the content and can be shared.

The following describes the operation of the annotation sharing apparatus 1. FIG. 5 is a flowchart illustrating processing (addition of an annotation) performed by the annotation sharing apparatus 1 to store the annotation information in the DB 202.

At step 100 (S100), the first presentation unit 100 reads the content data of an electronic book, for example.

At step 102 (S102), the first presentation unit 100 reproduces the voice of the content, for example.

At step 104 (S104), the acquisition unit 102 determines whether the annotation information is added by the user. That is, the acquisition unit 102 determines whether the user has added the annotation information during the reproduction of the content. If it is determined that the annotation information is not added by the user (No at S104), the acquisition unit 102 proceeds to the processing at S100. When the annotation information is not added, the reproduction of the content is continued. If it is determined that the annotation information is added by the user (Yes at S104), the acquisition unit 102 proceeds to the processing at S106.

At step 106 (S106), the acquisition unit 102 acquires the attribute and the value of the annotation. For example, the attribute of the annotation is the type (attribute) and the value of the annotation is additional information (value) as illustrated in FIG. 4. The attribute and the value constitute the annotation information. For example, when the annotation instruction by the user is pen input, the acquisition unit 102 acquires stroke information about the pen and interprets the acquired information as marking information. The annotation instruction is not limited to the pen input. The annotation instruction may be a typical selection and instruction input for determination such as pressing down of a button (not illustrated) during the voice reproduction and an instruction given by selection from a menu on a screen.

At step 108 (S108), the position calculation unit 104 calculates the position of the annotation. Specific processing in which the position calculation unit 104 calculates the position of the annotation is described later with reference to FIG. 6 and the like.

At step 110 (S110), the storing unit 200 stores the annotation information in the DB 202.

At step 112 (S112), the annotation sharing apparatus 1 determines whether the content being reproduced reaches the end thereof. If it is determined that the content being reproduced does not reach the end (No at S112), the annotation sharing apparatus 1 proceeds to the processing at S100. If it is determined that the content being reproduced reaches the end (Yes at S112), the annotation sharing apparatus 1 ends the processing.

Figure 6:
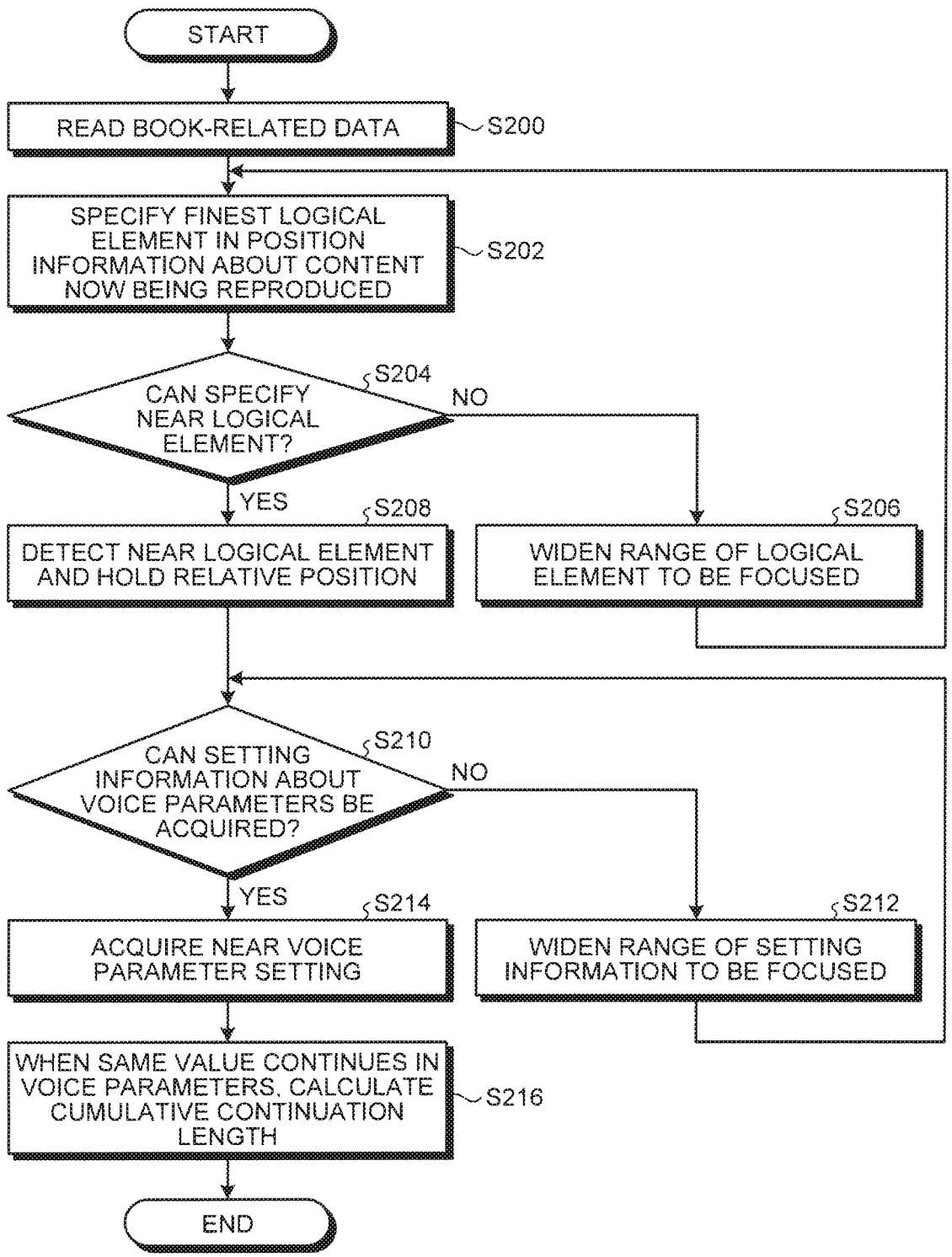
FIG. 6 is a flowchart illustrating processing performed by a position calculation unit when calculating a position of an annotation.

FIG. 6 is a flowchart illustrating processing performed by the position calculation unit 104 when calculating the position of the annotation.

At step 200 (S200), the position calculation unit 104 reads the book-related data of the book serving as the content. The book-related data is the navigation data in which voices and text contents are in association with each other, for example.

At step 202 (S202), the position calculation unit 104 specifies the finest logical element (e.g., any of ID1 to ID4 illustrated in FIG. 9, which are described later) in the position information about the content the annotation sharing apparatus 1 now reproduces. The information about the text is assumed not to be acquired. The logical element means the data indicated by text such as a document structure.

At step 204 (S204), the position calculation unit 104 determines whether a near logical element other than a voice, such as a chapter structure and a chart, can be specified. If it is determined that the near logical element cannot be specified (No at S204), the position calculation unit 104 proceeds to the processing at S206. If it is determined that the near logical element can be specified (Yes at S204), the position calculation unit 104 proceeds to the processing at S208.

At step 206 (S206), the position calculation unit 104 widens the range of the logical element to be focused, and thereafter proceeds to the processing at S202.

At step 208 (S208), the position calculation unit 104 detects the near logical element and holds a relative position of the annotation with respect to the content and the logical element, for example.

At step 210 (S210), the position calculation unit 104 determines whether setting information about voice parameters can be acquired. The voice parameters mean the data that is not indicated by text, such as the voice data and the number of pauses where voices stop. If it is determined that the setting information about the voice parameters cannot be acquired (No at S210), the position calculation unit 104 proceeds to the processing at S212. If it is determined that the setting information about the voice parameters can be acquired (Yes at S210), the position calculation unit 104 proceeds to the processing at S214.

At step 212 (S212), the position calculation unit 104 widens the range of the setting information to be focused, and thereafter proceeds to the processing at S210.

At step 214 (S214), the position calculation unit 104 acquires the near voice parameter setting.

At step 216 (S216), the position calculation unit 104 calculates a cumulative continuation length when the same value continues in the voice parameters and continues the processing up to the end of the data.

The following specifically describes the processing performed by the position calculation unit 104 to calculate the relative position of the annotation and hold the calculated relative position (refer to FIG. 6). The position calculation unit 104 calculates the relative position of the annotation based on the logical element near the reading position, for example. FIG. 7 is a diagram exemplarily illustrating the logical element at the reading position. Specifically, FIG. 7 is the text (logical element) of meta data that indicates the correspondence between the starting time and the ending time of the voice file in seconds and the text areas.

In the example illustrated in FIG. 7, it is assumed that the element having an id="xqms_0004" is being read now. The position calculation unit 104 detects the head or the end of the logical element, which is counted in the finest acquirable unit in the logical elements of the document, such as chapters and sections, and holds the relative position from the head or the end on the basis of a cumulative time or the appearing number of logical elements.

For example, in the example illustrated in FIG. 7, the position calculation unit 104 determines that 2.357 seconds elapse from the head in the current minimum logical element (e.g., a section or a paragraph) because the element having the ID starts from 2.357 seconds. When the following logical element is assumed to be the end, the element ends at 9.227 seconds and a relative difference in position is 9.227 seconds minus 2.357 seconds when the counting is performed from the end. The position calculation unit 104, thus, determines that an interval of 6.870 seconds exists. The position calculation unit 104 may calculate the position of the annotation in the content using the time elapsed from the time when a feature amount of the content reproduced in a voice is produced or the time elapsed until the time when the feature amount is produced.

FIG. 8 is a diagram exemplarily illustrating the logical elements of the reading parameter. In FIG. 8, an example of the text data (original text) is illustrated on the left side while an example of the book-related data (meta data) corresponding to the example of the text data is illustrated on the right side. The book-related data may be added by the user later. The book-related data is usable for the position calculation unit 104 to calculate the position.

In the example, as illustrated on the left side in FIG. 8, the paragraph in the first half of the text data is designated to be read by a female speaker (voice synthesis dictionary name="Hanako") while the paragraph in the second half of the text data is designated to be read by a male speaker (voice synthesis dictionary name="Kenji").

The current reading position is the last paragraph in the text data, which is "further utilization of this book . . . " and corresponds to id="xqms_0007" in the book-related data.

In the book-related data illustrated on the right side in FIG. 8, speakers are designated for the respective ids. For example, the speaker is defined as "Hanako" from id="xqms_0003" to id="xqms-0004" and as "Kenji" from id="xqms_0005" to id="xqms_0007".

Herein, the position calculation unit 104 calculates the relative position and the cumulative time from the current position to the point where the speaker is switched because the position calculation unit 104 can specify the speaker change position. The storing unit 200 stores the relative position and the cumulative time that are calculated by the position calculation unit 104 in the DB 202.

As described above, the position calculation unit 104 detects the near logical element and holds the relative position of the annotation when the near logical element can be specified. When the position of the annotation cannot be specified in detail with the near logical element, the position calculation unit 104 approximately employs the logical elements in a wider range including the current area to be focused by widening the range of the logical element to be focused. For example, the position calculation unit 104 extends the range to the logical element that allows the relative position to be acquired in the order of a line, a paragraph, a section, a chapter, and the whole of the book in a typical book logical structure.

When the setting information about the voice parameters (including the setting values such as the pitch and the tempo besides the speakers) can be acquired, the position calculation unit 104 acquires the near voice parameter setting, and when the same value continues, the position calculation unit 104 calculates the cumulative continuation length. As described above, the position calculation unit 104 widens the range of the setting information to be focused up to the range that allows the relative position to be acquired also for the voice parameters.

When the relative position of the annotation is calculated, the storing unit 200 stores, in the DB 202, the annotation for the content and the relative position of the annotation in the content in association with each other and in a readable manner.

FIG. 9 is a diagram schematically illustrating a specific example of the data stored in the DB 202 by the storing unit 200. As illustrated in FIG. 9, the original text and the book-related data of <text src="abc #003" id="xxx_0003"/> are provided as the annotation addition destination (object) in the electronic book data, for example. In the DB 202, the attributes and the values are stored as the annotations for the content data as follows: "comments" ("it is so scary" and "it is so rich") and "handwriting" (double line drawn in red), which is the stroke information about the handwriting.

Under such preconditions, description examples of the relative position of the annotation are illustrated in the table in FIG. 9. The column on the left side in the table illustrates the ID numbers that distinguish the respective pieces of relative position information. Starting from the left, the column next to that for the ID numbers in FIG. 9 illustrates the reference destinations serving as the starting points. The reference destinations serving as the starting points indicate the points accessible from the outside without accessing the text data of the content. The succeeding column indicates the elapsed times in seconds from the reference destinations serving as the starting points. The succeeding columns define the speaking speeds and speakers in this order.

In FIG. 9, the information having ID=0 exemplarily illustrates a case where the annotation sharing apparatus 1 can directly refer to (access) the original text. For example, when ID=0, the current reading position is the logical element of the document corresponding to # xxx_0003 (the id number directly added to the document element).

The information having ID=1 exemplarily illustrates a case where the annotation sharing apparatus 1 can refer to the chapter/section structure. In this case, the annotation sharing apparatus 1 is allowed the access on a unit basis such as "third section in the second chapter" as the starting position at the section in the chapter. It is indicated that the current reading position is the position to which 23.45 seconds elapse from the starting position at the section in the chapter, for example. Furthermore, in this case, the defined speaking speed is not changed (zero, which is default) and the speaker is Kenji.

The information having ID=2 illustrates an example of definition when the annotation sharing apparatus 1 can refer to the element that indicates the chapter structure, the chart, or the title of the chart. In this case, the annotation sharing apparatus 1 can use, as the starting point, the position of "FIG. 2", which is the logical element of the chart or its title, besides "second chapter". It is indicated that the current reading position is the position to which 3.13 seconds elapse from the starting position of the chapter structure, the chart, or its title, for example. Furthermore, in this case, the speaking speed is corrected to "+3" (speed faster by three steps) and the speaker is "Kenji".

The information having ID=3 is an example of definition when the annotation sharing apparatus 1 can refer to the chapter structure and the voice reading information. In this case, the annotation sharing apparatus 1 can use, as the starting point, the position where the speaker is changed (from "kenji" to "Hanako") besides "second chapter". It is indicated that the current reading position is the position to which 10.3 seconds elapse from the position where the speaker is changed, for example. The speaking speed at the time is corrected to "−2" (speed slower by two steps) and the current speaker is "Hanako".

The information having ID=4 is also an example of the definition when the annotation sharing apparatus 1 can refer to the chapter structure and the voice reading information, which is the same as that having ID=3. In this case, the annotation sharing apparatus 1 can use, as the reference destination serving as the starting point, the position to which 5.2 seconds elapse from the position where the appearing number of pauses (pause is a blank period in which silence continues for a fixed time) in voices as supplementary information for detailing the rough position information such as "second chapter". The (correction of) speaking speed is zero (the default speaking speed) and the speaker is "Hanako".

That is, the annotation sharing apparatus 1 stores, in the DB 202, the (relative) position with which the annotation is associated and the attribute and the value of the annotation every time the annotation appears.

The annotation sharing apparatus 1 performs the storing every appearance of annotation during content reproduction, and ends the processing when the content reaches the end thereof. If the content still continues, the annotation sharing apparatus 1 reads data and returns to the beginning processing.

Figure 10:
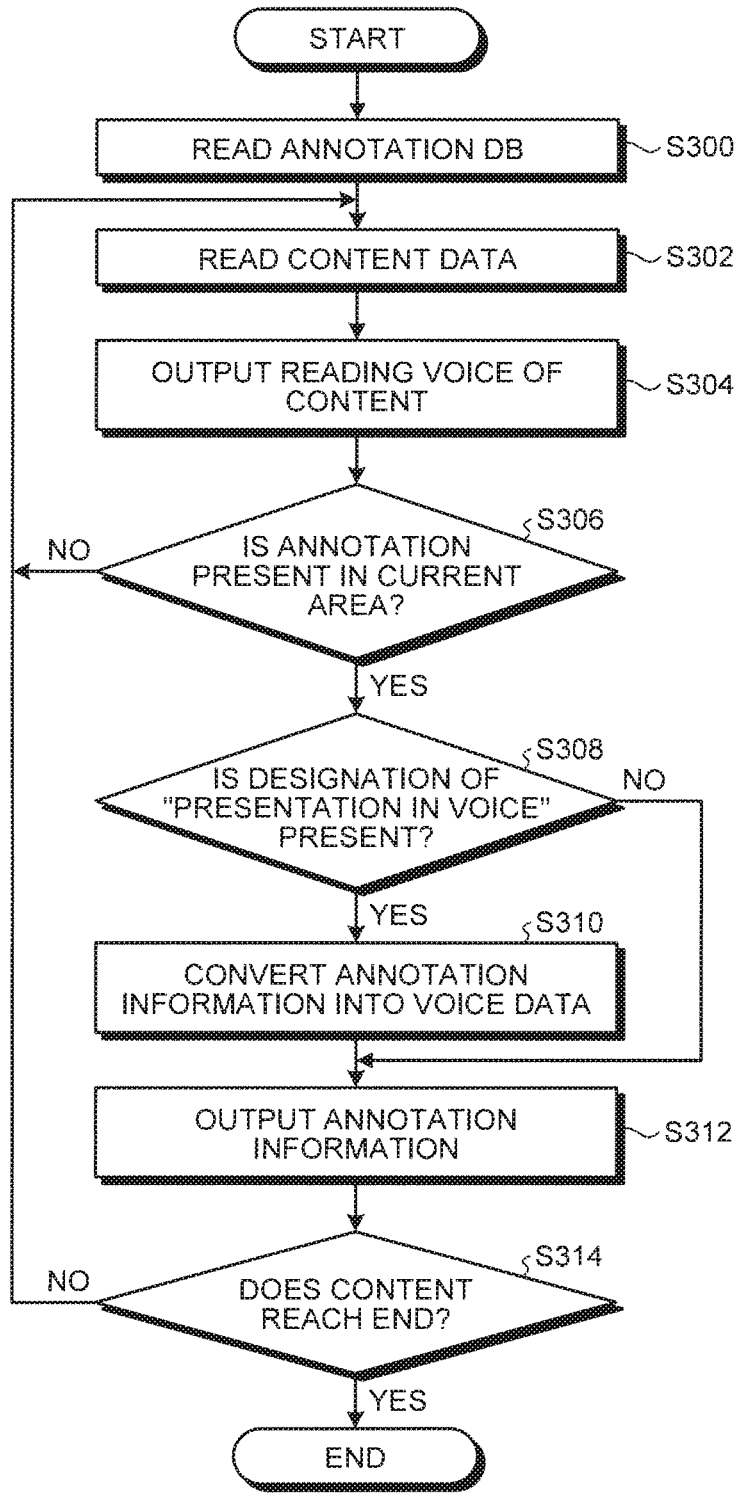
FIG. 10 is a flowchart illustrating processing performed by the annotation sharing apparatus according to the embodiment when presenting the annotation.

The following describes the processing performed by the annotation sharing apparatus 1 to present the annotation. FIG. 10 is a flowchart illustrating the processing performed by the annotation sharing apparatus 1 when presenting the annotation.

At step 300 (S300), the annotation sharing apparatus 1 reads the annotation stored in the DB 202 by the storing unit 200 (reads an annotation DB), for example.

At step 302 (S302), the annotation sharing apparatus 1 reads the content data. In this case, the object to be read is a book (likewise for the same book) other than the book to which the annotation is added, for example.

At step 304 (S304), the annotation sharing apparatus 1 outputs (reproduces) the reading voice of the content.

At step 306 (S306), the second presentation unit 120 determines whether the annotation is present in (added to) the area that is now being reproduced in the content. If it is determined that the annotation is absent (No at S306), the second presentation unit 120 proceeds to the processing at S302. If it is determined that the annotation is present (Yes at S306), the second presentation unit 120 proceeds to the processing at S308.

At step 308 (S308), the second presentation unit 120 determines whether a designation of "presentation in voice" is present, for example. If it is determined that the designation of "presentation in voice" is absent (No at S308), the second presentation unit 120 proceeds to the processing at S312. If it is determined that the designation of "presentation in voice" is present (Yes at S308), the second presentation unit 120 proceeds to the processing at S310.

At step 310 (S310), the second presentation unit 120 converts the annotation information into the voice data.

At step 312 (S312), the second presentation unit 120 outputs the annotation information (or the annotation).

At step 314 (S314), the annotation sharing apparatus 1 determines whether the content reaches the end thereof. If it is determined that the content under reproduction does not reach the end (No at S314), the annotation sharing apparatus 1 proceeds to the processing at S302. If it is determined that the content under reproduction reaches the end (Yes at S314), the annotation sharing apparatus 1 ends the processing.

The annotation sharing apparatus 1 may explicitly present the annotation on the screen or present the annotation in a voice by interrupting the reading voice of the original text. The annotation sharing apparatus 1 may present only the presence or absence of the annotation. The annotation sharing apparatus 1 may be configured to output further detailed information (the value of a comment, for example) as a display or a voice in accordance with the user's instruction or operation.

When the content is reproduced as an audio book, which requires no screen display, for example, the annotation sharing apparatus 1 may convert the annotation into the voice data in accordance with the instruction of "presentation in voice" and output the comment character strings included in the annotation by voice synthesis. In this case, too, the annotation sharing apparatus 1 may present only a sound effect or a signal that indicates the presence or the absence of the annotation in accordance with the user's instruction.

The annotation sharing apparatus according to the embodiment calculates the position of the annotation in the content using the content-related information, thereby enabling the annotation at the position pointed in the content to be shared without using the content body. The annotation sharing apparatus enables the annotation at the position pointed in the content to be shared even if not only the display of the content but also the voice parameters such as the reproduction speed, the tempo, and the speakers are changed in the reproduction of the reading voice.

The annotation sharing program executed by the annotation sharing apparatus in the embodiment is recorded and provided in a computer-readable recording medium such as a compact disc read only memory (CD-ROM), a flexible disk (FD), a compact disc recordable (CD-R), and a digital versatile disc (DVD), as an installable or executable file.

The annotation sharing program executed by the annotation sharing apparatus in the embodiment may be stored in a computer connected to a network such as the Internet and provided by being downloaded via the network.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An annotation sharing method, comprising:
outputting a content of an electronic book;
acquiring an annotation positioned in the content;
calculating a position of the acquired annotation in the content by using metadata, which represents information related to the content, without using data included in the content, the metadata including a logical structure of the content, the logical structure including one or more logical elements representing a line, a paragraph, a section, and a chapter of the content, whose ranges widen in this order; and
storing the calculated position and the annotation in association with each other and in a readable manner,
wherein the calculating includes
reading the metadata and specifying a finest logical element for part of the content that is being output,
determining whether a near logical element, which is the finest logical element near the output part of the content, is specified or not, and
when it is determined that the near logical element is not specified, widening a range of the logical elements to be focused for specifying the near logical element until the position of the acquired annotation in the content is specified by calculating the position thereof, the widening being performed step by step in an order of a line, a paragraph, a section, a chapter, and a whole of the content.

2. The method according to claim 1, further comprising storing, in a server via a network, the calculated position in the content and the annotation in association with each other.

3. The method according to claim 1, further comprising outputting the annotation at the stored position in the content during the output of the content.

4. The method according to claim 3, further comprising:
reading the position of the annotation in the content and the annotation that are stored in a readable manner; and
outputting the annotation in a voice at the read position in the content.

5. The method according to claim 1, further comprising calculating the position of the acquired annotation in the content using at least one of information that specifies a position in a logical element of the content, information that specifies a position in meta data of the content, and information that specifies a time elapsed from a time when a feature amount of the content reproduced in a voice is produced, a time elapsed until the feature amount is produced, and information that specifies a position in a logical element where a parameter in the content reproduced in a voice is designated.

6. The method according to claim 1, further comprising acquiring the annotation for the content from handwritten input or voice input.

7. An annotation sharing apparatus, comprising:
memory configured to function as a storing unit; and
one or more processors configured to function as a content presentation unit, an acquisition unit, and a position calculation unit, wherein
the content presentation unit outputs a content of an electronic book;
the acquisition unit acquires an annotation positioned in the content output by the content presentation unit;
the position calculation unit calculates a position of the acquired annotation in the content by using metadata, which represents information related to the content, without using data included in the content, the metadata including a logical structure of the content, the logical structure including one or more logical elements representing a line, a paragraph, a section, and a chapter of the content, whose ranges widen in this order; and the storing unit stores therein the position in the content and the annotation in association with each other, wherein in calculating the position of the acquired annotation in the content, the position calculation unit reads the metadata and specifies a finest logical element for part of the content that is being output, determines whether a near logical element, which is the finest logical element near the output part of the content, is specified or not, and when it is determined that the near logical element is not specified, widens a range of the logical elements to be focused for specifying the near logical element until the position of the acquired annotation in the content is specified by calculating the position thereof, the widening being performed step by step in an order of a line, a paragraph, a section, a chapter, and a whole of the content.

8. An annotation sharing apparatus, comprising:

memory configured to function as a storing unit; and one or more processors configured to function as an annotation presentation unit, wherein the storing unit further stores therein an annotation positioned in a content of an electronic book and a position of the annotation in the content in association with each other and in a readable manner, the position being calculated by using metadata, which represents information related to the content, without using data included in the content, the metadata including a logical structure of the content, the logical structure including one or more logical elements representing a line, a paragraph, a section, and a chapter of the content, whose ranges widen in this order; and the annotation presentation unit presents, during the output of the content, the annotation at the position in the content, the position being stored by the storing unit, and wherein the calculation of the position of the annotation in the content includes processing of reading the metadata and specifying a finest logical element for part of the content that is being output, determining whether a near logical element, which is the finest logical element near the output part of the content, is specified or not, and when it is determined that the near logical element is not specified, widening a range of the logical elements to be focused for specifying the near logical element until the position of the annotation in the content is specified by calculating the position thereof, the widening being performed step by step in an order of a line, a paragraph, a section, a chapter, and a whole of the content.

9. An annotation sharing apparatus, comprising:

memory configured to function as a storing unit; and one or more processors configured to function as a content presentation unit, an acquisition unit, a position calculation unit, and an annotation presentation unit, wherein the content presentation unit outputs a content of an electronic book;

the acquisition unit acquires an annotation positioned in the content output by the content presentation unit;

the position calculation unit calculates a position of the annotation in the content, the annotation being acquired by the acquisition unit, by using metadata, which represents information related to the content, without using data included in the content, the metadata including a logical structure of the content, the logical structure including one or more logical elements representing a line, a paragraph, a section, and a chapter of the content, whose ranges widen in this order;

the storing unit stores, in a server, the annotation for the content and the calculated position of the annotation in the content in association with each other and in a readable manner; and the annotation presentation unit presents, during the output of the content, the annotation at the position in the content, the position being stored by the storing unit, wherein in calculating the position of the acquired annotation in the content, the position calculation unit reads the metadata and specifies a finest logical element for part of the content that is being output, determines whether a near logical element, which is the finest logical element near the output part of the content, is specified or not, and when it is determined that the near logical element is not specified, widens a range of the logical elements to be focused for specifying the near logical element until the position of the acquired annotation in the content is specified by calculating the position thereof, the widening being performed step by step in an order of a line, a paragraph, a section, a chapter, and a whole of the content.

10. A computer program product comprising a non-transitory computer-readable medium including programmed instructions, the instructions causing a computer to execute:

outputting a content of an electronic book;

acquiring an annotation positioned in the content;

calculating a position of the acquired annotation in the content by using metadata, which represents information related to the content, without using data included in the content, the metadata including a logical structure of the content, the logical structure including one or more logical elements representing a line, a paragraph, a section, and a chapter of the content, whose ranges widen in this order; and storing the calculated position in the content and the annotation in association with each other and in a readable manner, wherein the calculating includes reading the metadata and specifying a finest logical element for part of the content that is being output, determining whether a near logical element, which is the finest logical element near the output part of the content, is specified or not, and when it is determined that the near logical element is not specified, widening a range of the logical elements to be focused for specifying the near logical element until the position of the acquired annotation in the content is specified by calculating the position thereof, the widening being performed step by step in an order of a line, a paragraph, a section, a chapter, and a whole of the content.

* * * * *